(12) United States Patent
Yang

(10) Patent No.: US 11,330,570 B2
(45) Date of Patent: May 10, 2022

(54) DATA TRANSMISSION METHOD AND APPARATUS

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/475,083

(22) PCT Filed: Dec. 30, 2016

(86) PCT No.: PCT/CN2016/113826
§ 371 (c)(1),
(2) Date: Jun. 29, 2019

(87) PCT Pub. No.: WO2018/120160
PCT Pub. Date: Jul. 5, 2018

(65) Prior Publication Data
US 2019/0335448 A1 Oct. 31, 2019

(51) Int. Cl.
*H04W 72/04* (2009.01)
*H04W 72/12* (2009.01)
*H04W 72/14* (2009.01)

(52) U.S. Cl.
CPC ..... *H04W 72/0413* (2013.01); *H04W 72/042* (2013.01); *H04W 72/048* (2013.01); *H04W 72/1284* (2013.01); *H04W 72/14* (2013.01)

(58) Field of Classification Search
CPC ........... H04W 72/0413; H04W 72/042; H04W 72/048; H04W 72/1284
See application file for complete search history.

(56) References Cited

U.S. PATENT DOCUMENTS

| 8,305,985 B2 | 11/2012 | Chun et al. |
| 8,576,784 B2 | 11/2013 | Lohr et al. |
| (Continued) | | |

FOREIGN PATENT DOCUMENTS

| CN | 101355788 | 1/2009 |
| CN | 101521938 | 9/2009 |
| (Continued) | | |

OTHER PUBLICATIONS

Idaho National Laboratory, "Frame Structure for Ultra-Low Latency Scheduled-based UL Access," 3GPP TSG-RAN WG1 #86bis, R1-1608710, Oct. 2016, 5 pages.

(Continued)

*Primary Examiner* — Brenda H Pham
(74) *Attorney, Agent, or Firm* — Hodgson Russ LLP

(57) ABSTRACT

A data transmission method includes: sending, by a terminal device, scheduling request information to a network device, the scheduling request information being indicative of a service type of data to be transmitted by the terminal device, a resource quantity of uplink resource required by the terminal device, or a type of numerology supported by the terminal device; receiving, by the terminal device, uplink resource grant information from the network device, the uplink resource grant information indicating a target uplink resource allocated for the terminal device, and being determined according to the scheduling request information; and performing, by the terminal device, data transmission using the target uplink resource according to the uplink resource grant information.

13 Claims, 6 Drawing Sheets

(56) References Cited

U.S. PATENT DOCUMENTS

| | | | |
|---|---|---|---|
| 8,639,259 B2 | 1/2014 | Ishii et al. | |
| 2007/0201397 A1 | 8/2007 | Zhang | |
| 2012/0044880 A1* | 2/2012 | Sun | H04W 72/1242 |
| | | | 370/329 |
| 2014/0050090 A1* | 2/2014 | Nordstrom | H04W 72/1268 |
| | | | 370/232 |
| 2015/0181618 A1* | 6/2015 | Yang | H04L 69/03 |
| | | | 370/329 |
| 2016/0100430 A1 | 4/2016 | Dabeer et al. | |
| 2016/0286429 A1* | 9/2016 | Chen | H04W 28/0278 |
| 2017/0156157 A1* | 6/2017 | Zhang | H04W 72/1278 |
| 2018/0249513 A1* | 8/2018 | Chang | H04W 72/04 |

FOREIGN PATENT DOCUMENTS

| | | |
|---|---|---|
| CN | 101978758 | 2/2011 |
| CN | 102685895 | 9/2012 |
| CN | 102833857 | 12/2012 |
| CN | 103313411 | 9/2013 |
| CN | 104717693 | 6/2015 |
| CN | 105682237 | 6/2016 |
| EP | 2675081 | 12/2013 |
| RU | 2545099 | 3/2015 |
| WO | 2012122924 | 9/2012 |
| WO | 2015139862 | 9/2015 |

OTHER PUBLICATIONS

EPO, Office Action for EP Application No. 16925092.5, dated Nov. 7, 2019.
WIPO, ISR for PCT/CN2016/113826, Sep. 15, 2017.
CNIPA, First Office Action for CN Application No. 201680091954.5, dated Mar. 10, 2020 Mar. 10, 2020.
CNIPA, First Office Action for CN Application No. 201680091954.5, dated Mar. 10, 2020.
"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321, Dec. 2018, V15.4.0, 131 pages.
FSIP, Office Action for RU Application No. 2019123844-07, dated May 21, 2020.
SIPO, Second Office Action for CN Application No. 201680091954.5, dated Jun. 18, 2020.
JPO, Office Action for JP Application No. 2019-536041, dated Feb. 12, 2021.
TIPO, Office Action for TW Application No. 106142297, dated Feb. 20, 2021.
EPO, Communication for EP Application No. 16925092.5, dated Feb. 4, 2021.
Intel Corporation, "Scheduling request design for NR," 3GPP TSG-RAN WG1 #87, R1-1611998, Nov. 2016, 4 pages.
Ericsson et al., "E-DCH Priority Based Scheduling," TSG-RAN Working Group 2 meeting #47, Tdoc R2-051371, May 2005, 14 pages.
INPI, Office Action for BR Application No. 112019013550-2, dated Sep. 15, 2020.
SIPO, Third Office Action for CN Application No. 201680091954.5, dated Sep. 14, 2020.
IPI, Office Action for IN Application No. 201917028195, dated Sep. 20, 2020.
ISDEC, Office Action for CA Application No. 3049038, dated Aug. 11, 2020.
INAPI, Office Action for CL Application No. 201901811, dated Oct. 20, 2020.
IPOS, Office Action for SG Application No. 11201906093W, dated Sep. 14, 2020.
ILPO, Office Action for IL Application No. 267720, dated Jun. 23, 2021.
IPOS, Office Action for SG Application No. 11201906093W, dated Jul. 27, 2021.
INAPI, Office Action for CL Application No. 201901811, dated Jul. 20, 2021.
ISDEC, Office Action for CA Application No. 3049038, dated Jun. 10, 2021.
EPO, Communication for EP Application No. 16925092.5, dated Sep. 8, 2021.
IPA, Office Action for AU Application No. 2016434922, dated Sep. 22, 2021.

* cited by examiner

DATA TRANSMISSION METHOD AND APPARATUS

CROSS-REFERENCE TO RELATED APPLICATION

This application is a U.S. national phase application of International Application No. PCT/CN2016/113826, filed Dec. 30, 2016, the entire disclosure of which is incorporated herein by reference.

TECHNICAL FIELD

Embodiments of the present disclosure relate to the field of communications, and more particularly, to a data transmission method and apparatus.

BACKGROUND

In the Long Term Evolution (LTE) system, a data transmission manner based on network side scheduling is adopted by most data channels. As shown in FIG. 1, the data transmission based on the network side scheduling mainly includes the following steps. In step 1, the terminal device initiates Scheduling Request (SR) information; in step 2, the network device sends, according to the SR information of the terminal device, uplink resource grant (or uplink grant, UG) information to the terminal device; in step 3, the terminal device transmits, according to the UG information, uplink data through corresponding uplink resource, where Buffer Status Report (BSR) information may be sent through the data channel by using the uplink resource if there is remaining data in a buffer of the terminal device; and in step 4, the network device further sends UG according to the BSR information. These steps may be repeated and not end until the terminal device does not initiate the SR information.

In the above data transmission manner, the terminal device may need to discard some data packets in data transmission and preferentially transmit the BSR information. This problem has a great impact on services that are sensitive to time delay, causing the delay requirement of such services to fails to be met. Such services include, for example, Ultra-reliable and Low Latency Communications (URLLC) service.

SUMMARY

The application provides a method and apparatus for data transmission to improve the efficiency of data transmission.

According to a first aspect, there is provided a data transmission method, including: sending, by a terminal device, scheduling request information to a network device, the scheduling request information including a service type of data to be transmitted by the terminal device, a resource quantity of uplink resource required by the terminal device, or a type of numerology supported by the terminal device; receiving, by the terminal device, uplink resource grant information from the network device, the uplink resource grant information indicating target uplink resource allocated for the terminal device, and being determined according to the scheduling request information; and performing, by the terminal device, data transmission using the target uplink resource according to the uplink resource grant information.

In the embodiment of the present application, the scheduling request information sent by the terminal device to the network device includes the service type of data to be transmitted by the terminal device, the resource quantity of uplink resource required by the terminal device, or the type of numerology supported by the terminal device, enabling the network device to flexibly allocate the target uplink resource for the terminal device according to the scheduling request information, thereby improving the efficiency of allocating the uplink resource.

In a possible implementation, a type of the scheduling request information is used to indicate the service type of data to be transmitted by the terminal device or a type of numerology supported by the terminal device. The method, prior to the sending, by a terminal device, scheduling request information to a network device, further includes: determining, by the terminal device, the type of the scheduling request information according to the service type of data to be transmitted by the terminal device or the type of numerology supported by the terminal device.

In the embodiment of the present application, different types of scheduling request information are configured for the terminal device according to different requirements of uplink resource at the terminal device, so as to flexibly indicate to the network device the service type of data to be transmitted by the terminal device, the resource quantity of uplink resource required by the terminal device, or the type of numerology supported by the terminal device, enabling the network device to flexibly allocate the target uplink resource for the terminal device, thereby improving the efficiency of allocating the uplink resource.

In a possible implementation, the determining the type of the scheduling request information includes: determining, by the terminal device, the number of bits of the scheduling request information according to the service type of data to be transmitted by the terminal device or the type of numerology supported by the terminal device.

In the embodiment of the present application, the scheduling request information of different numbers of bits is configured to indicate different requirements of the terminal equipment for the uplink resources, so as to achieve reasonable allocation of signaling overhead. Moreover, the number of bits of the scheduling request information is used to implicitly indicate the service type of data to be transmitted by the terminal device or the type of numerology supported by the terminal device, thereby achieving the purpose of saving signaling overhead.

In a possible implementation manner, the service type of data to be transmitted includes a plurality of service types of data to be transmitted.

In the embodiment of the present application, the scheduling request information may indicate a plurality of service types of data to be transmitted, enabling the network device to flexibly allocate uplink resources, thereby improving flexibility of scheduling request information.

In a possible implementation, the uplink resource grant information includes dynamic priority indication information, the dynamic priority indication information is used to indicate priority information of at least one logical channel, the at least one logical channel is used to carry data of different service types, respectively. The performing, by the terminal device, data transmission using the target uplink resource according to the uplink resource grant information includes: transmitting, by the terminal device using the target uplink resource, data carried on a logical channel according to the priority information of the at least one logical channel.

In the embodiment of the present application, the dynamic priority indication information is included in the uplink resource grant information to indicate the priority information of the at least one logical channel, where the at least one logical channel is used to respectively carry data of different service types, enabling the terminal device to transmit, according to the priority information, the logical channel carrying data of a corresponding service type using the target uplink resource as allocated, thereby increasing scheduling flexibility of the uplink resource grant information and improving the efficiency of transmitting the uplink resource.

In a possible implementation, the priority information of the at least one logical channel is dynamically set.

According to a second aspect, there is provided a data transmission method, including: receiving, by a network device, scheduling request information from a terminal device, the scheduling request information including a service type of data to be transmitted by the terminal device, a resource quantity of uplink resource required by the terminal device, or a type of numerology supported by the terminal device; and sending, by the network device, uplink resource grant information to the terminal device, the uplink resource grant information indicating target uplink resource allocated for the terminal device, being determined according to the scheduling request information, and causing the terminal device to perform data transmission using the target uplink resource according to the uplink resource grant information.

In the embodiment of the present application, the scheduling request information received by the network device from the terminal device includes the service type of data to be transmitted by the terminal device, the resource quantity of uplink resource required by the terminal device, or the type of numerology supported by the terminal device, enabling the network device to flexibly allocate the target uplink resource for the terminal device according to the scheduling request information, thereby improving the efficiency of allocating the uplink resource.

In a possible implementation, a type of the scheduling request information is used to indicate the service type of data to be transmitted by the terminal device or the type of numerology supported by the terminal device, and the method further includes: determining, by the network device, the service type of data to be transmitted by the terminal device or the type of numerology supported by the terminal device according to the type of the scheduling request information.

In a possible implementation, the determining, by the network device, the service type of data to be transmitted by the terminal device or the type of numerology supported by the terminal device according to the type of the scheduling request information includes: determining, by the network device, the service type of data to be transmitted by the terminal device or the type of numerology supported by the terminal device according to the number of bits of the scheduling request information.

In a possible implementation, the service type of data to be transmitted includes a plurality of service types of data to be transmitted.

In a possible implementation, the uplink resource grant information includes dynamic priority indication information, the dynamic priority indication information is used to indicate priority information of at least one logical channel, and the at least one logical channel is used to carry data of different service types, respectively.

In a possible implementation, the priority information of the at least one logical channel is dynamically set.

According to a third aspect, there is provided a data transmission method, including: receiving, by a terminal device, uplink resource grant information sent by a network device, the uplink resource grant information indicating target uplink resource allocated for the terminal device, and including dynamic priority indication information, the dynamic priority indication information being used to indicate priority information of at least one logical channel, and the at least one logical channel being used to carry data of different service types, respectively; and transmitting, by the terminal device using the target uplink resource, data carried on a logical channel according to the priority information of the at least one logical channel.

In the embodiment of the present application, the dynamic priority indication information is included in the uplink resource grant information to indicate the priority information of the at least one logical channel, where the at least one logical channel is used to respectively carry data of different service types, enabling the terminal device to transmit, according to the priority information, the logical channel carrying data of a corresponding service type using the target uplink resource as allocated, thereby increasing scheduling flexibility of the uplink resource grant information and improving the efficiency of transmitting the uplink resource.

In a possible implementation, the priority information of the at least one logical channel is dynamically set.

According to a fourth aspect, there is provided a data transmission method, including: sending, by a network device, uplink resource grant information to a terminal device, the uplink resource grant information indicating target uplink resource allocated for the terminal device, and including dynamic priority indication information; the dynamic priority indication information being used to indicate priority information of at least one logical channel, and causing the terminal device to transmit data carried on a logical channel using the target uplink resource, wherein the at least one logical channel is used to carry data of different service types, respectively.

In the embodiment of the present application, the dynamic priority indication information is included in the uplink resource grant information to indicate the priority information of the at least one logical channel, where the at least one logical channel is used to respectively carry data of different service types, enabling the terminal device to transmit, according to the priority information, the logical channel carrying data of a corresponding service type using the target uplink resource as allocated, thereby increasing scheduling flexibility of the uplink resource grant information and improving the efficiency of transmitting the uplink resource.

In a possible implementation, the priority information of the at least one logical channel is dynamically set.

According to a fifth aspect, there is provided a terminal device, configured to perform the method according to the first aspect and any possible implementation thereof as described above. Specifically, the terminal device includes units configured to perform the method according to the first aspect and any possible implementation thereof as described above.

According to a sixth aspect, there is provided a network device, configured to perform the method according to the second aspect and any possible implementation thereof as described above. Specifically, the network device includes units configured to perform the method according to the first aspect and any possible implementation thereof as described above.

According to a seventh aspect, there is provided a terminal device, configured to perform the method according to the third aspect and any possible implementation thereof as described above. Specifically, the terminal device includes units configured to perform the method according to the third aspect and any possible implementation thereof as described above.

According to an eighth aspect, there is provided a network device, configured to perform the method according to the fourth aspect and any possible implementation thereof as described above. Specifically, the network device includes units configured to perform the method according to the fourth aspect and any possible implementation thereof as described above.

According to a ninth aspect, there is provided a communication system, including the terminal device according to the fifth aspect as described above and the network device according to the sixth aspect as described above.

According to a tenth aspect, there is provided a communication system, including the terminal device according to the seventh aspect as described above and the network device according to the eighth aspect as described above.

According to an eleventh aspect, there is provided a terminal device, including: a memory configured to store a program; a communication interface, configured to communicate with another device; and a processor, configured to execute the program in the memory. When the program is executed, the processor is caused to perform the method according to the first aspect.

According to a twelfth aspect, there is provided a network device, including: a memory configured to store a program; a communication interface, configured to communicate with another device; and a processor, configured to execute the program in the memory. When the program is executed, the processor is caused to perform the method according to the second aspect.

According to a thirteenth aspect, there is provided a terminal device, including: a memory configured to store a program; a communication interface, configured to communicate with another device; and a processor, configured to execute the program in the memory. When the program is executed, the processor is caused to perform the method according to the third aspect.

According to a fourteenth aspect, there is provided a network device, including: a memory configured to store a program; a communication interface, configured to communicate with another device; and a processor, configured to execute the program in the memory. When the program is executed, the processor is caused to perform the method according to the fourth aspect.

According to a fifteenth aspect, there is provided a communication system, including the terminal device according to the eleventh aspect as described above and the network device according to the twelfth aspect as described above.

According to a sixteenth aspect, there is provided a communication system, including the terminal device according to the thirteenth aspect as described above and the network device according to the fourteenth aspect as described above.

DETAILED DESCRIPTION

The technical solutions in the embodiments of the present application will be described below with reference to the accompanying drawings.

It should be understood that the technical solutions according to the embodiments of the present application may be applied to various communication systems, for example, Global System of Mobile communication (referred to as "GSM") system, Code Division Multiple Access (referred to as "CDMA") system, Wideband Code Division Multiple Access (referred to as "WCDMA") system, General Packet Radio Service (referred to as "GPRS"), Long Term Evolution (referred to as "LTE") system, LTE Frequency Division Duplex (referred to as "FDD") system, LTE Time Division Duplex (referred to as "TDD") system, Universal Mobile Telecommunication System (referred to as "UMTS") or Worldwide Interoperability for Microwave Access (referred to as "WiMAX") communication system, New Radio (NR) system (or 5G system), 4.5G system and the like.

The terminal device involved in the embodiments of the present application may include various handheld devices, in-vehicle devices, wearable devices, computing devices having wireless communication functions or other processing devices connected to wireless modem, and various forms of User Equipment (UE), Mobile Station (MS), terminal, terminal device and the like. For convenience of description, in the embodiment of the present application, the devices mentioned above are collectively referred to as terminal devices.

The network device in the embodiment of the present application may be a device for communicating with a terminal device, which may include a Base Transceiver Station (BTS) in GSM or CDMA, a NodeB (NB) in the WCDMA system, an Evolutional NodeB (eNB or eNodeB) in the LTE system, or a wireless controller in a Cloud Radio Access Network (CRAN) scenario. The network device may also include a relay station, an access point, an in-vehicle device, a wearable device and the like, and is not limited in the embodiment of the present application.

Figure 2:
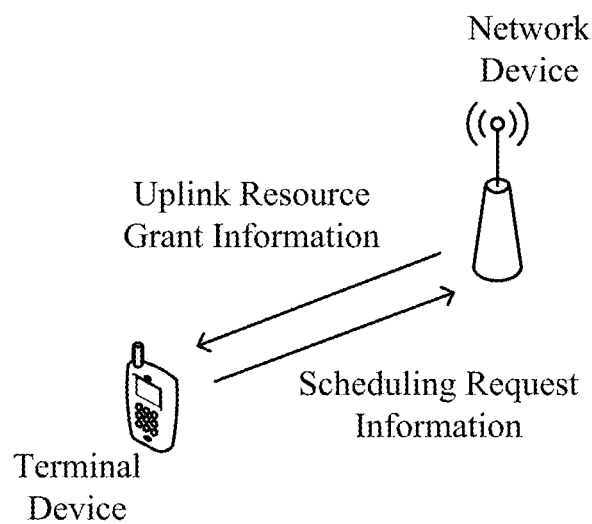
FIG. 2 is an application scenario diagram according to an embodiment of the present application.

FIG. 2 is an application scenario diagram according to an embodiment of the present application. As shown in FIG. 2, communication is performed between the terminal device and the network device. The terminal device may send the scheduling request information to the network device. After receiving the scheduling request information, the network device may send the uplink resource grant information to the terminal device according to the scheduling request information, where the uplink resource grant information is used to indicate the uplink resource allocated for the terminal device. After receiving the uplink resource grant information, the terminal device may use the uplink resource indicated by the uplink resource grant information to transmit uplink data.

Figure 3:
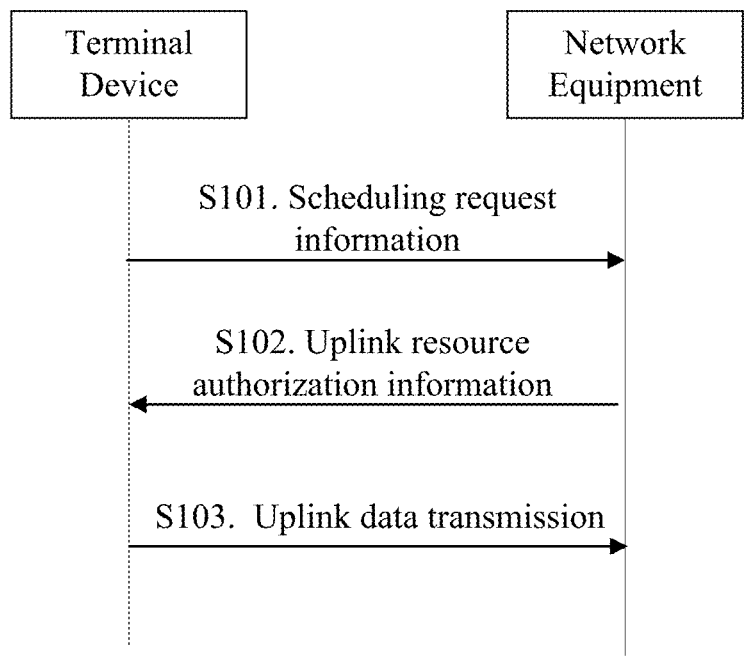
FIG. 3 is a schematic diagram illustrating a data transmission method according to another embodiment of the present application.

FIG. 3 is a schematic diagram illustrating a data transmission method 100 according to another embodiment of the present application. The method 100 may be performed by a terminal device or a network device. As shown in FIG. 3, the method 100 includes following steps.

In step S101, the terminal device sends scheduling request information to the network device. The scheduling request information may include a service type of data to be transmitted by the terminal device, a resource quantity of uplink resource required by the terminal device, or a type of numerology supported by the terminal device. The network device receives the scheduling request information.

For example, the scheduling request information may use different bits to indicate the service type of data to be transmitted by the terminal device, the resource quantity of uplink resource required by the terminal device, or the type of numerology supported by the terminal device, thereby assisting the network device to determine service condition of the terminal device, such that the network device is able to allocate a suitable target uplink resource for the terminal device.

It should be understood that the resource quantity of uplink resource required by the terminal device may be represented by multiple representation manners. For example, the resource quantity of uplink resource required by the terminal device may be represented by a data volume size or a traffic volume size of data to be transmitted by the terminal device.

In step S102, the terminal device receives uplink resource grant information from the network device, the uplink resource grant information indicating target uplink resource allocated for the terminal device, and being determined according to the scheduling request information.

In step S103, the terminal device transmits data using the target uplink resource according to the uplink resource grant information. The network device receives the data.

In the embodiment of the present application, the scheduling request information sent by the terminal device to the network device includes the service type of data to be transmitted by the terminal device, the resource quantity of uplink resource required by the terminal device, or the type of numerology supported by the terminal device, enabling the network device to flexibly allocate the target uplink resource for the terminal device according to the scheduling request information, thereby improving the efficiency of allocating the uplink resource.

Optionally, different types of terminal devices may send different types of scheduling request information.

Optionally, a type of the scheduling request information is used to indicate the service type of data to be transmitted by the terminal device or the type of numerology supported by the terminal device. Before the terminal device sending scheduling request information to the network device, the method further includes: the terminal device determines the type of the scheduling request information according to the service type of data to be transmitted by the terminal device or the type of numerology supported by the terminal device.

In the embodiment of the present application, different types of scheduling request information are configured for the terminal device according to different requirements of uplink resource at the terminal device, so as to flexibly indicate to the network device the service type of data to be transmitted by the terminal device, the resource quantity of uplink resource required by the terminal device, or the type of numerology supported by the terminal device, enabling the network device to flexibly allocate the target uplink resource for the terminal device, thereby improving the efficiency of allocating the uplink resource.

Optionally, foregoing types of the terminal devices may be defined in multiple manners.

As an example, the types of terminal devices may be distinguished according to different service types of data to be transmitted. For example, it may be classified into a terminal device that only requests enhanced Mobile Broadband (referred to as "eMBB") service, and a terminal device that only requests URLLC service and a terminal device that simultaneously requests eMBB service and URLLC service.

As another example, the terminal devices may be divided according to different numerologies supported by them. For example, it may be divided into a terminal device that can support only a single numerology and a terminal device that can simultaneously support multiple numerologies.

Optionally, the network device may determine the service type of data to be transmitted by the terminal device or the type of numerology supported by the terminal device according to the type of the scheduling request information. For example, the network device may determine the service type of data to be transmitted by the terminal device or the type of numerology supported by the terminal device according to the number of bits of the scheduling request information.

Different types of terminal devices may send different types of scheduling request information and, in an embodiment, may send scheduling request information with different numbers of bits.

The number of bits of the scheduling request information may indicate different service types of data to be transmitted by the terminal device or different types of numerology supported by the terminal device.

In the embodiment of the present application, the scheduling request information of different numbers of bits is configured to indicate different requirements of the terminal equipment for the uplink resources, so as to achieve reasonable allocation of signaling overhead. Moreover, the number of bits of the scheduling request information is used to implicitly indicate the service type of data to be transmitted by the terminal device or the type of numerology supported by the terminal device, thereby achieving the purpose of saving signaling overhead.

Different types of scheduling request information may include different numbers of bits. For example, there may be 1 bit, 2 bits or more bits. The number of bits of the scheduling request information may take into account implementation complexity or overhead of the physical control channel in actual implementation.

Optionally, the number of bits of the scheduling request information may indicate different service types of data to be transmitted by the terminal device or different types of numerology supported by the terminal device.

In the embodiment of the present application, the number of bits of the scheduling request information implicitly indicates the service type of data to be transmitted by the terminal device or the type of numerology supported by the terminal device, thereby achieving the purpose of saving signaling overhead.

As an example, if the scheduling request information includes 1 bit, the scheduling request information may be used to indicate a single service request. For example, "0" (zero) may be used to indicate that, traffic of the terminal device may be below a preset traffic threshold, and "1" may be used to indicated that, the data traffic to be transmitted by the terminal device may be above the preset traffic threshold.

Optionally, if the scheduling request information includes 2 bits, the scheduling request information may be used to indicate a multi-service request. For example, 2 bits may represent two types of services. Specifically, "00" and "01" may correspond to the data size of the first service type to be transmitted by the terminal device; "11" and "10" may be used to indicate the data size of the second service type to be transmitted by the terminal device.

Optionally, when the scheduling request information includes more bits, the scheduling request information may indicate, with a finer granularity, the service type or the type of numerology supported by the terminal device, and indicate the data size of data to be transmitted corresponding to the service type.

It should be understood that the foregoing traffic volume of the terminal device or the data size of a certain service type to be transmitted by the terminal device is the same as or similar to the concept of the resource quantity of uplink resource requested by the terminal device. In other words, the foregoing traffic volume of the terminal device or the data size to be transmitted by the terminal device may represent the resource quantity of uplink resource requested by the terminal device.

The above traffic threshold may be configured by the network side with high layer signaling, for example, Radio Resource Control (RRC) signaling.

The size of the above traffic threshold may be dynamically adjusted according to different situations. For example, the traffic threshold may be increased or decreased according to historical transmission traffic record of the terminal device.

Optionally, the service type of data to be transmitted may include multiple service types of data to be transmitted. That is, as can be seen from forgoing examples, the scheduling request information in the embodiment of the present application may indicate multiple service types of data to be transmitted which are requested by the terminal device. For example, when the scheduling request information include 2 bits or more, the scheduling request information may indicate multiple service types of data to be transmitted and corresponding resource quantity thereof.

In the embodiment of the present application, the scheduling request information may indicate multiple service types of data to be transmitted, enabling the network device to flexibly allocate uplink resources, thereby improving flexibility of scheduling request information.

Optionally, the uplink resource grant information includes dynamic priority indication information, where the dynamic priority indication information is used to indicate priority information of at least one logical channel, and the at least one logical channel is used to carry different service types respectively. Accordingly, when performing data transmission using the target uplink resource according to the uplink resource grant information, the terminal device transmits, using the target uplink resource, data carried on a logical channel according to the priority information of the at least one logical channel.

In the embodiment of the present application, the dynamic priority indication information is included in the uplink resource grant information to indicate the priority information of the at least one logical channel, where the at least one logical channel is used to respectively carry data of different service types, enabling the terminal device to transmit, according to the priority information, the logical channel carrying data of a corresponding service type using the target uplink resource as allocated, thereby increasing scheduling flexibility of the uplink resource grant information and improving the efficiency of transmitting the uplink resource.

The dynamic priority indication information is used to indicate the priority information of multiple logical channels. Since the multiple logical channels may be allocated to carry data of different service types, the priority information of the multiple logical channels may also be understood as priority information indicating data transmission of multiple corresponding service types.

As an example, the priority information of the at least one logical channel may indicate the highest priority logical channel. For example, in a specific implementation manner of the foregoing dynamic priority indication information, a priority parameter may be provided. Parameter values of the priority parameters may be indicative of different logical channels. For example, when a parameter value of the priority parameter is indicative of a logical channel carrying the URLLC service, the terminal device takes the logical channel as the highest priority and transmits the logical channel on the indicated target uplink resource.

As another example, the priority of the at least one logical channel may also indicate a prioritization for a plurality of logical channels. For example, a priority parameter table may be provided. Parameter values of the priority parameter table may be indicative of different logical channels. The prioritization of the plurality of logical channels may be determined by an ordering of indications corresponding to the logical channels in the priority parameter table. For example, 0001 indicates the logical channel 1, 0002 indicates the logical channel 2. If 0001 is ranked before 0002, priority of the logical channel corresponding to 0001 is higher than that of the logical channel corresponding to 0002, such that the terminal device may preferentially schedule the service transmission of the logical channel 0001 using the target uplink resource.

As another example, in the foregoing implementation manners of the dynamic priority indication information, a priority mapping table may be provided by including mapping identifiers, with each mapping identifier corresponding to one logical channel. Parameters of the priority mapping table may be indicated by different mapping indications. For example, the mapping indications may be configured using network high-layer signaling; e.g., 0 is mapped to a logical channel 0001, 1 is mapped logical channel 0002, and so on.

Optionally, the priority information of the at least one logical channel is dynamically set. In other words, in the embodiment of the present application, the network device may dynamically and flexibly indicate the priority information of the logical channel according to the current network condition or other factors, thereby improving the flexibility of uplink resource transmission.

Optionally, after receiving the uplink resource grant information from the network device, the terminal device may firstly check whether the uplink resource grant information includes the dynamic priority indication information. If yes, the terminal device transmits the corresponding logical channel according to the dynamic priority indication information. If not, the terminal device may transmit data carried by the logical channel according to a default rule. For example, the corresponding logical channel may be transmitted according to an existing logical channel prioritization (LCP) rule.

The data transmission method 200 according to an embodiment of the present application is described below. The method 200 may be performed by a network device, and includes following steps.

In step S201, the network device receives scheduling request information from a terminal device. The scheduling request information may include a service type of data to be transmitted by the terminal device, a resource quantity of uplink resource required by the terminal device, or a type of numerology supported by the terminal device.

In step S202, the network device sends uplink resource grant information to the terminal device. The uplink resource grant information indicates target uplink resource allocated for the terminal device, and is determined according to the scheduling request information, such that the terminal device may perform data transmission using the target uplink resource according to the uplink resource grant information.

In the embodiment of the present application, the scheduling request information received by the network device from the terminal device includes the service type of data to be transmitted by the terminal device, the resource quantity of uplink resource required by the terminal device, or the type of numerology supported by the terminal device, enabling the network device to flexibly allocate the target uplink resource for the terminal device according to the scheduling request information, thereby improving the efficiency of allocating the uplink resource.

Optionally, different types of terminal devices may send different types of scheduling request information.

Optionally, a type of the scheduling request information is used to indicate the service type of data to be transmitted by the terminal device or the type of numerology supported by the terminal device, and the method further includes: determining, by the network device, the service type of data to be transmitted by the terminal device or the type of numerology supported by the terminal device according to the type of the scheduling request information.

Optionally, the determining, by the network device, the service type of data to be transmitted by the terminal device or the type of numerology supported by the terminal device according to the type of the scheduling request information includes: determining, by the network device, the service type of data to be transmitted by the terminal device or the type of numerology supported by the terminal device according to the number of bits of the scheduling request information.

Optionally, the number of bits of the scheduling request information may indicate different service types of data to be transmitted by the terminal device or different types of numerology supported by the terminal device.

Optionally, the service type of data to be transmitted includes multiple service types of data to be transmitted.

Optionally, the uplink resource grant information includes dynamic priority indication information, the dynamic priority indication information is used to indicate priority information of at least one logical channel, and the at least one logical channel is used to carry data of different service types, respectively.

Optionally, the priority information of the at least one logical channel is dynamically set.

Figure 4:
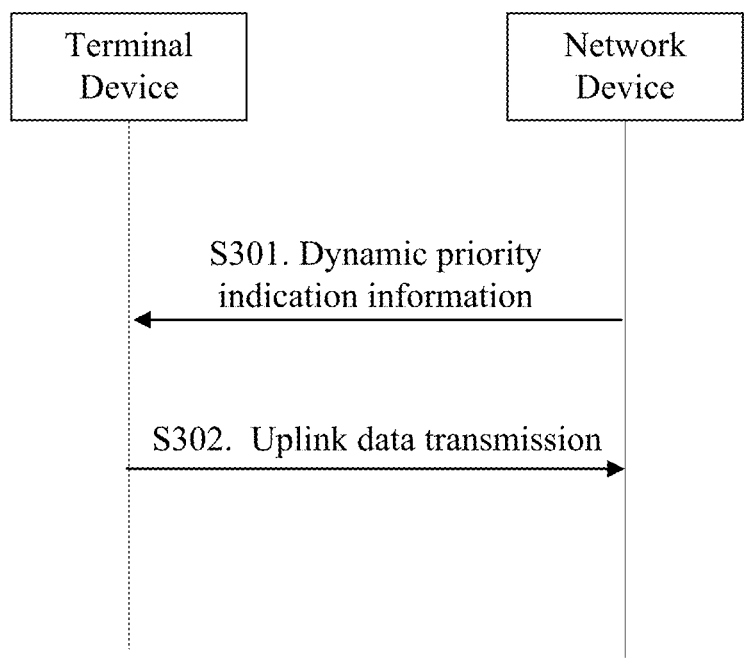
FIG. 4 is a schematic diagram illustrating a data transmission method according to still another embodiment of the present application.

FIG. 4 is a schematic diagram illustrating a data transmission method 300 according to an embodiment of the present application. As shown in FIG. 4, the method 300 includes following steps.

In step S301, the terminal device receives uplink resource grant information sent by a network device. The uplink resource grant information indicates target uplink resource allocated for the terminal device, and includes dynamic priority indication information, the dynamic priority indication information being used to indicate priority information of at least one logical channel, and the at least one logical channel being used to carry data of different service types, respectively.

In step S302, the terminal device transmits, using the target uplink resource, data carried on a logical channel according to the priority information of the at least one logical channel.

In the embodiment of the present application, the dynamic priority indication information is included in the uplink resource grant information to indicate the priority information of the at least one logical channel, where the at least one logical channel is used to respectively carry data of different service types, enabling the terminal device to transmit, according to the priority information, the logical channel carrying data of a corresponding service type using the target uplink resource as allocated, thereby increasing scheduling flexibility of the uplink resource grant information and improving the efficiency of transmitting the uplink resource.

Optionally, the priority information of the at least one logical channel is dynamically set.

A data transmission method 400 according to an embodiment of the present application is described below. The method 400 may be performed by a network device, and includes following steps.

In step S401, the network device sends uplink resource grant information to a terminal device, the uplink resource grant information indicating target uplink resource allocated for the terminal device, and including dynamic priority indication information; the dynamic priority indication information being used to indicate priority information of at least one logical channel, and causing the terminal device to transmit data carried on a logical channel using the target uplink resource, wherein the at least one logical channel is used to carry data of different service types, respectively.

In the embodiment of the present application, the dynamic priority indication information is included in the uplink resource grant information to indicate the priority information of the at least one logical channel, where the at least one logical channel is used to respectively carry data of different service types, enabling the terminal device to transmit, according to the priority information, the logical channel carrying data of a corresponding service type using the target uplink resource as allocated, thereby increasing scheduling flexibility of the uplink resource grant information and improving the efficiency of transmitting the uplink resource.

Optionally, the priority information of the at least one logical channel is dynamically set.

The data transmission method in accordance with embodiments of the present disclosure is described above in conjunction with FIGS. 1 to 4. The data transmission apparatus in accordance with embodiments of the present disclosure will be described below with reference to FIGS. 5 to 12.

Figure 5:
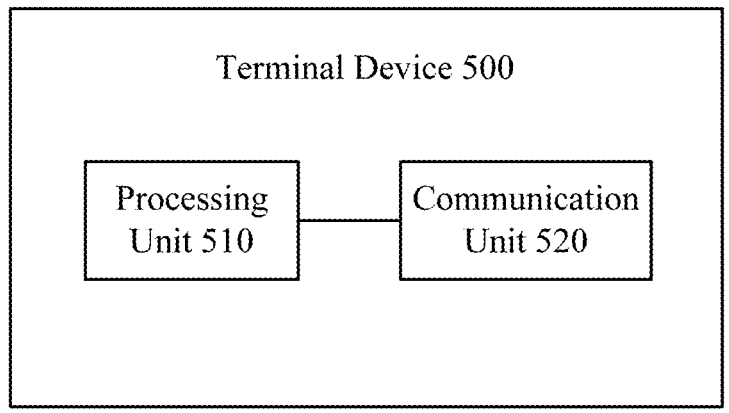
FIG. 5 is a block diagram illustrating a terminal device according to an embodiment of the present application.

FIG. 5 is a block diagram illustrating a terminal device 500 according to an embodiment of the present application.

Figure 1:
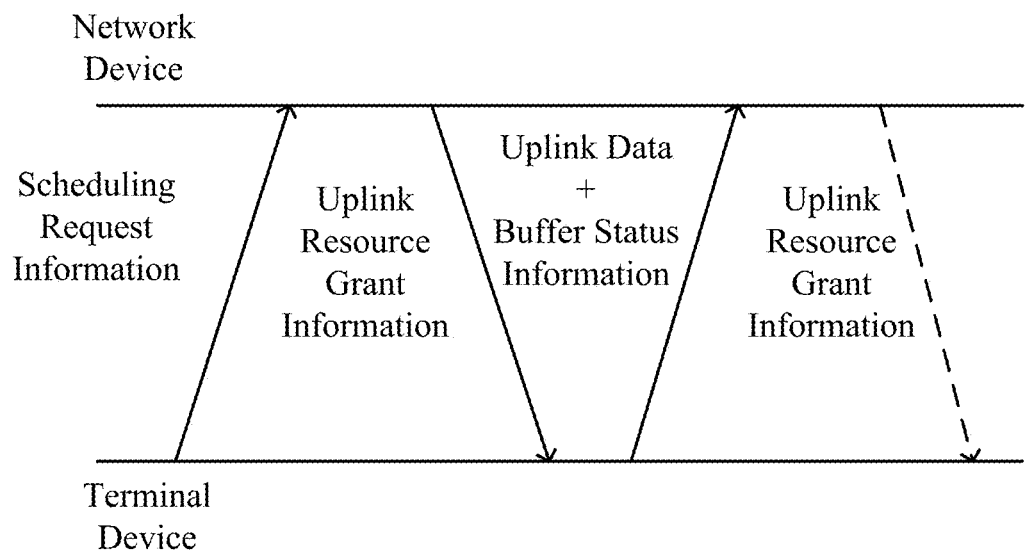
FIG. 1 is a schematic interaction diagram illustrating a data transmission method according to an embodiment of the present application.

The terminal device 500 is capable of implementing the steps performed by the terminal device in FIGS. 1 to 3. The terminal device 500 includes a processing unit 510 and a communication unit 520, The processing unit 510 is configured to send, through the communication unit 520, scheduling request information to a network device, the scheduling request information including a service type of data to be transmitted by the terminal device, a resource quantity of uplink resource required by the terminal device, or a type of numerology supported by the terminal device; receive, through the communication unit 520, uplink resource grant information from the network device, the uplink resource grant information indicating target uplink resource allocated for the terminal device, and being determined according to the scheduling request information; and perform, through the communication unit 520, data transmission using the target uplink resource according to the uplink resource grant information.

Optionally, a type of the scheduling request information is used to indicate the service type of data to be transmitted by the terminal device or a type of numerology supported by the terminal device, and the processing unit 510 is further configured to, prior to sending, through the communication unit 520, scheduling request information to the network device, determine the type of the scheduling request information according to the service type of data to be transmitted by the terminal device or the type of numerology supported by the terminal device.

Optionally, different types of terminal devices may include, the processing unit 510 configured to determine the type of the scheduling request information is specifically configured to determine the number of bits of the scheduling request information according to the service type of data to be transmitted by the terminal device or the type of numerology supported by the terminal device.

Optionally, the service type of data to be transmitted includes multiple service types of data to be transmitted.

Optionally, the uplink resource grant information includes dynamic priority indication information, the dynamic priority indication information is used to indicate priority information of at least one logical channel, and the at least one logical channel is used to carry data of different service types, respectively. The processing unit 510 configured to perform data transmission using the target uplink resource according to the uplink resource grant information is specifically configured to transmit, through the communication unit 520 using the target uplink resource, data carried on a logical channel according to the priority information of the at least one logical channel.

Optionally, the priority information of the at least one logical channel is dynamically set.

Figure 6:
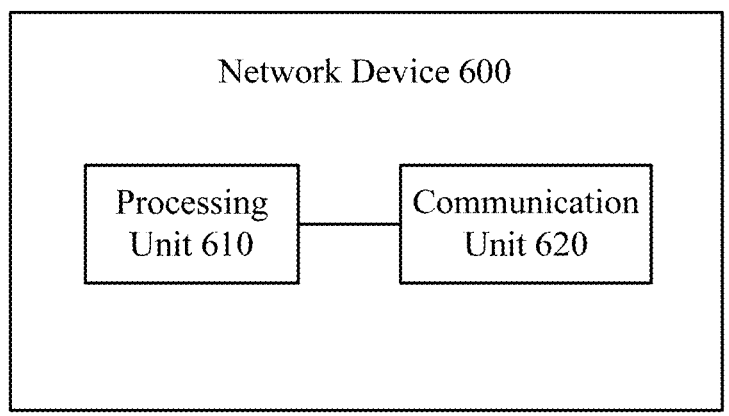
FIG. 6 is a block diagram illustrating a network device according to an embodiment of the present application.

FIG. 6 is a block diagram illustrating a network device 600 according to an embodiment of the present application. The network device 600 is capable of implementing the steps performed by the network device in FIG. 1 to FIG. 3. The network device 600 includes a processing unit 610 and a communication unit 620.

The processing unit 610 is configured to receive, through the communication unit 620, scheduling request information from a terminal device, the scheduling request information including a service type of data to be transmitted by the terminal device, a resource quantity of uplink resource required by the terminal device, or a type of numerology supported by the terminal device; and send, through the communication unit 620, uplink resource grant information to the terminal device, the uplink resource grant information indicating target uplink resource allocated for the terminal device, and being determined according to the scheduling request information, such that the terminal device may perform data transmission using the target uplink resource according to the uplink resource grant information.

Optionally, a type of the scheduling request information is used to indicate the service type of data to be transmitted by the terminal device or a type of numerology supported by the terminal device, and the processing unit 610 is further configured to determine the service type of data to be transmitted by the terminal device or the type of numerology supported by the terminal device according to the type of the scheduling request information.

Optionally, the processing unit 610 configured to determine the service type of data to be transmitted by the terminal device or the type of numerology supported by the terminal device according to the type of the scheduling request information is specifically configured to determine the service type of data to be transmitted by the terminal device or the type of numerology supported by the terminal device according to the number of bits of the scheduling request information.

Optionally, the service type of data to be transmitted includes multiple service types of data to be transmitted.

Optionally, the uplink resource grant information includes dynamic priority indication information, the dynamic priority indication information is used to indicate priority information of at least one logical channel, and the at least one logical channel is used to carry data of different service types, respectively.

Optionally, the priority information of the at least one logical channel is dynamically set.

Figure 7:
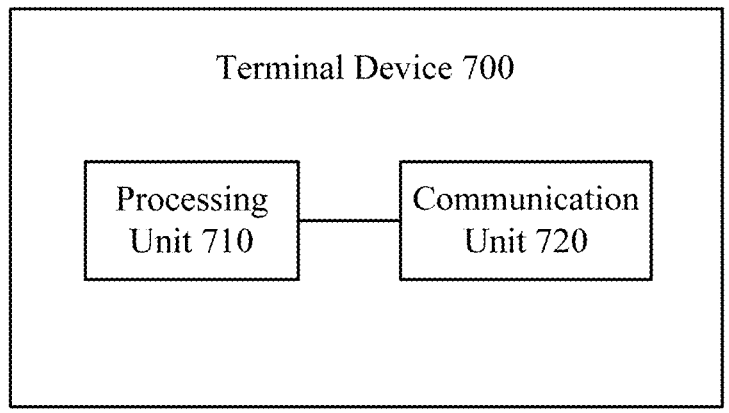
FIG. 7 is a block diagram illustrating a terminal device according to another embodiment of the present application.

FIG. 7 is a block diagram illustrating a terminal device according to an embodiment of the present application. The terminal device 700 is capable of implementing the steps performed by the terminal device in FIG. 4. The terminal device 700 includes a processing unit 710 and a communication unit 720.

The processing unit 710 is configured to receive, through the communication unit 720, uplink resource grant information sent by a network device, the uplink resource grant information indicating target uplink resource allocated for the terminal device, and including dynamic priority indication information, the dynamic priority indication information being used to indicate priority information of at least one logical channel, and the at least one logical channel being used to carry data of different service types, respectively; and transmit, through the communication unit 720 using the target uplink resource, data carried on a logical channel according to the priority information of the at least one logical channel.

Optionally, the priority information of the at least one logical channel is dynamically set.

Figure 8:
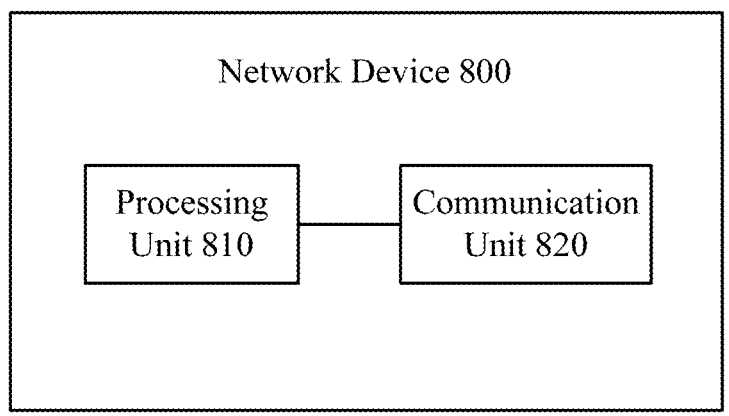
FIG. 8 is a block diagram illustrating a terminal device according to still another embodiment of the present application.

FIG. 8 is a block diagram illustrating a terminal device according to still another embodiment of the present application. The network device 800 is capable of implementing the steps performed by the network device in FIG. 4. The network device 800 includes a processing unit 810 and a communication unit 820.

The processing unit 810 is configured to send, through the communication unit 820, uplink resource grant information to a terminal device, the uplink resource grant information indicating target uplink resource allocated for the terminal device, and including dynamic priority indication information; the dynamic priority indication information being used to indicate priority information of at least one logical channel, such that the terminal device may transmit data carried on a logical channel using the target uplink resource, wherein the at least one logical channel is used to carry data of different service types, respectively.

Optionally, the priority information of the at least one logical channel is dynamically set.

Figure 9:
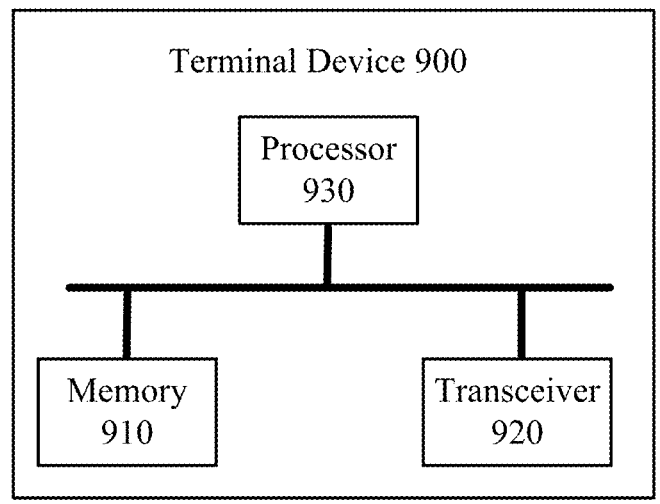
FIG. 9 is a block diagram illustrating a terminal device according to yet another embodiment of the present application.

FIG. 9 is a block diagram illustrating a terminal device 900. The terminal device 900 is capable of implementing the steps performed by the terminal device in FIG. 1 to FIG. 3. The terminal device 900 includes:

a memory 910, configured to store a program;

a transceiver 920, configured to communicate with other devices; and a processor 930, configured to execute the program stored in the memory 910.

When the program is executed, the processor 930 is configured to send, through the transceiver 920, scheduling request information to a network device, the scheduling request information including a service type of data to be transmitted by the terminal device, a resource quantity of uplink resource required by the terminal device, or a type of numerology supported by the terminal device; receive, through the transceiver 920, uplink resource grant information from the network device, the uplink resource grant information indicating target uplink resource allocated for the terminal device, and being determined according to the scheduling request information; and perform, through the transceiver 920, data transmission using the target uplink resource according to the uplink resource grant information.

Optionally, a type of the scheduling request information is used to indicate the service type of data to be transmitted by the terminal device or a type of numerology supported by the terminal device, and the processor 930 is further configured to, prior to sending, through the transceiver 920, scheduling request information to the network device, determine the type of the scheduling request information according to the service type of data to be transmitted by the terminal device or the type of numerology supported by the terminal device.

Optionally, different types of terminal devices may include, the processor 930 configured to determine the type of the scheduling request information is specifically configured to determine the number of bits of the scheduling request information according to the service type of data to be transmitted by the terminal device or the type of numerology supported by the terminal device.

Optionally, the service type of data to be transmitted includes multiple service types of data to be transmitted.

Optionally, the uplink resource grant information includes dynamic priority indication information, the dynamic priority indication information is used to indicate priority information of at least one logical channel, and the at least one logical channel is used to carry data of different service types, respectively. The processor 930 configured to perform data transmission using the target uplink resource according to the uplink resource grant information is specifically configured to transmit, through the transceiver 920 using the target uplink resource, data carried on a logical channel according to the priority information of the at least one logical channel.

Optionally, the priority information of the at least one logical channel is dynamically set.

Figure 10:
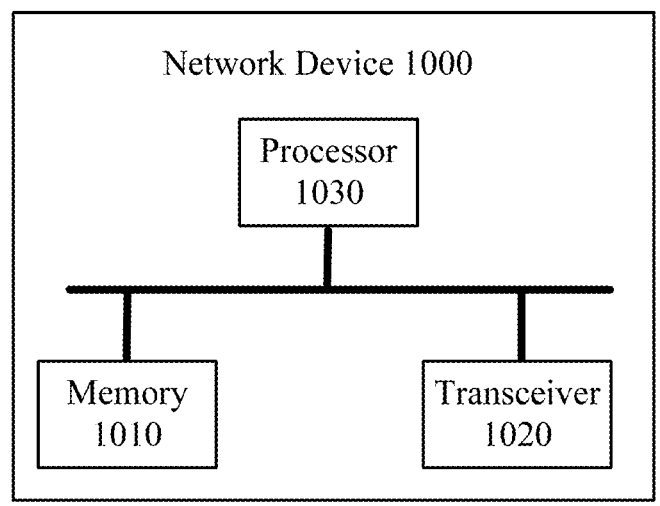
FIG. 10 is a block diagram illustrating a terminal device according to still another embodiment of the present application.

FIG. 10 is a block diagram illustrating a terminal device 1000 according to an embodiment of the present application. The network device 1000 is capable of implementing the steps performed by the network device in FIG. 1 to FIG. 3. The network device 1000 includes:

a memory 1010, configured to store a program;

a transceiver 1020 is configured to communicate with other devices; and a processor 1030 is configured to execute the program stored by the memory 1010. When the program is executed, the processor 1030 is configured to receive, through the transceiver 1020, scheduling request information from a terminal device, the scheduling request information including a service type of data to be transmitted by the terminal device, a resource quantity of uplink resource required by the terminal device, or a type of numerology supported by the terminal device; and send, through the transceiver 1020, uplink resource grant information to the terminal device, the uplink resource grant information indicating target uplink resource allocated for the terminal device, and being determined according to the scheduling request information, such that the terminal device may perform data transmission using the target uplink resource according to the uplink resource grant information.

Optionally, a type of the scheduling request information is used to indicate the service type of data to be transmitted by the terminal device or a type of numerology supported by the terminal device, and the processor 1030 is further configured to determine the service type of data to be transmitted by the terminal device or the type of numerology supported by the terminal device according to the type of the scheduling request information.

Optionally, the processor 1030 configured to determine the service type of data to be transmitted by the terminal device or the type of numerology supported by the terminal device according to the type of the scheduling request information is specifically configured to determine the service type of data to be transmitted by the terminal device or the type of numerology supported by the terminal device according to the number of bits of the scheduling request information.

Optionally, the service type of data to be transmitted includes multiple service types of data to be transmitted.

Optionally, the uplink resource grant information includes dynamic priority indication information, the dynamic priority indication information is used to indicate priority information of at least one logical channel, and the at least one logical channel is used to carry data of different service types, respectively.

Optionally, the priority information of the at least one logical channel is dynamically set.

Figure 11:
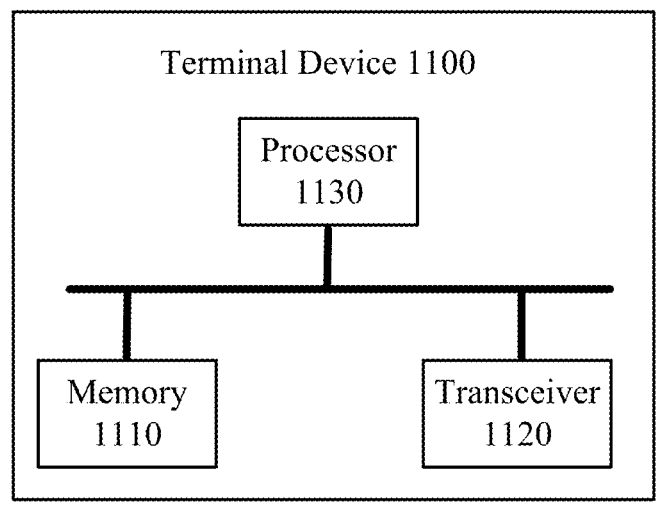
FIG. 11 is a block diagram illustrating a terminal device according to still another embodiment of the present application.

FIG. 11 is a block diagram illustrating a terminal device 1100 according to an embodiment of the present application. The terminal device 1100 is capable of implementing the steps performed by the terminal device in FIG. 4. The terminal device 1100 includes:

a memory 1110, configured to store a program;

a transceiver 1120 is configured to communicate with other devices; and a processor 1130 is configured to execute the program stored in the memory 1110. When the program is executed, the processor 1130 is configured to receive, through the transceiver 1120, uplink resource grant information sent by a network device, the uplink resource grant information indicating target uplink resource allocated for the terminal device, and including dynamic priority indication information, the dynamic priority indication information being used to indicate priority information of at least one logical channel, and the at least one logical channel being used to carry data of different service types, respectively; and transmit, through the transceiver 1120 using the target uplink resource, data carried on a logical channel according to the priority information of the at least one logical channel.

Optionally, the priority information of the at least one logical channel is dynamically set.

Figure 12:
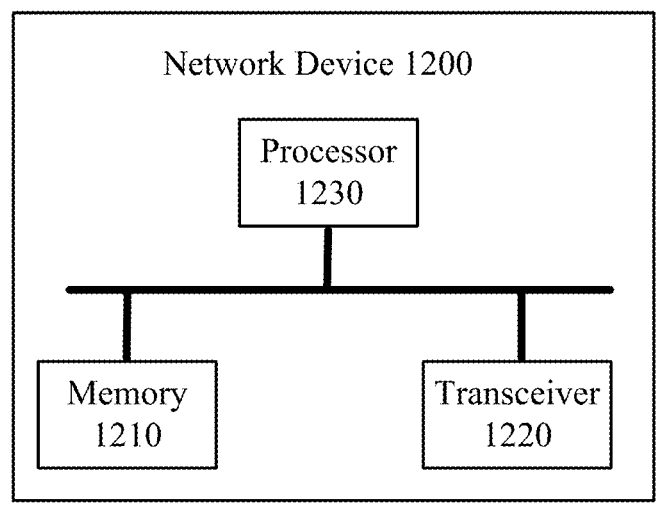
FIG. 12 is a block diagram illustrating a terminal device according to still another embodiment of the present application.

FIG. 12 is a block diagram illustrating a terminal device 1200 according to an embodiment of the present application. The network device 1200 is capable of implementing the steps performed by the network device in FIG. 4. The network device 1200 includes:

a memory 1210, configured to store a program;

a transceiver 1220 is configured to communicate with other devices; and a processor 1230 is configured to execute the program stored in the memory 1210. When the program is executed, the processor 1230 is configured to send, through the transceiver 1220, uplink resource grant information to a terminal device, the uplink resource grant information indicating target uplink resource allocated for the terminal device, and including dynamic priority indication information; the dynamic priority indication information being used to indicate priority information of at least one logical channel, such that the terminal device may transmit data carried on a logical channel using the target uplink resource, wherein the at least one logical channel is used to carry data of different service types, respectively.

Optionally, the priority information of the at least one logical channel is dynamically set.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the present application.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or Can be integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present application, which is essential or contributes to the prior art, or a part of the technical solution, may be embodied in the form of a software product, which is stored in a storage medium, including instructions used to cause a computer device (which may be a personal computer, server, or network device, etc.) to perform all or part of the steps of the methods described in various embodiments of the present application. The foregoing storage medium includes: a U disk, a mobile hard disk, a read-only memory (ROM), a random access memory (RAM), a magnetic disk, or an optical disk, and the like.

The foregoing is only a specific embodiment of the present application, but the scope of protection of the present application is not limited thereto, and any person skilled in the art can easily think of changes or substitutions within the technical scope disclosed in the present application. It should be covered by the scope of protection of this application. Therefore, the scope of protection of the present application should be determined by the scope of the claims.

What is claimed is:

1. A data transmission method, characterized in comprising:

sending, by a terminal device, scheduling request information to a network device, the scheduling request information being indicative of a type of numerology supported by the terminal device;

receiving, by the terminal device, uplink resource grant information from the network device, the uplink resource grant information indicating target uplink resource allocated for the terminal device, and being determined according to the scheduling request information; and performing, by the terminal device, data transmission using the target uplink resource according to the uplink resource grant information;

wherein a type of the scheduling request information is used for indicating the type of numerology supported by the terminal device, and the method, prior to the sending, by the terminal device, the scheduling request information to the network device, further comprises:

determining, by the terminal device, the type of the scheduling request information according to the type of numerology supported by the terminal device;

wherein the determining the type of the scheduling request information comprises:

determining, by the terminal device, a number of bits of the scheduling request information according to the type of numerology supported by the terminal device.

2. The method according to claim 1, wherein the uplink resource grant information comprises dynamic priority indication information, the dynamic priority indication information is used to indicate priority information of at least one logical channel, the at least one logical channel is used to carry data of different service types, respectively; and the performing, by the terminal device, data transmission using the target uplink resource according to the uplink resource grant information comprises:

transmitting, by the terminal device using the target uplink resource, data carried on a logical channel according to the priority information of the at least one logical channel.

3. The method according to claim 2, wherein the priority information of the at least one logical channel is dynamically set.

4. A data transmission method, characterized in comprising:
receiving, by a network device, scheduling request information from a terminal device, the scheduling request information being indicative of a type of numerology supported by the terminal device; and
sending, by the network device, uplink resource grant information to the terminal device, the uplink resource grant information indicating target uplink resource allocated for the terminal device, being determined according to the scheduling request information, and causing the terminal device to perform data transmission using the target uplink resource according to the uplink resource grant information;
wherein a type of the scheduling request information is used for indicating the type of numerology supported by the terminal device, and the method further comprises:
determining, by the network device, the type of numerology supported by the terminal device according to the type of the scheduling request information;
wherein the determining the type of the scheduling request information comprises:
determining, by the terminal device, a number of bits of the scheduling request information according to the type of numerology supported by the terminal device.

5. The method according claim 4, wherein different types of the scheduling request information are configured by the network device for the terminal device.

6. The method according to claim 4, wherein a service type of data to be transmitted by the terminal device includes at least one of enhanced mobile broadband (eMBB) service, ultra-reliable and low latency communications (URLLC) service, or massive machine type of communication (mMTC) service.

7. A terminal device, comprising:
a memory, configured to store a program;
a transceiver, configured to communicate with other devices; and
a processor, configured to execute the program stored in the memory, and when the program is executed, the processor is configured to:
send, through the transceiver, scheduling request information to a network device, the scheduling request information being indicative of a type of numerology supported by the terminal device;
receive, through the transceiver, uplink resource grant information from the network device, the uplink resource grant information indicating target uplink resource allocated for the terminal device, and being determined according to the scheduling request information; and
perform, through the transceiver, data transmission using the target uplink resource according to the uplink resource grant information;
wherein a type of the scheduling request information is used for indicating the type of numerology supported by the terminal device, and
wherein the processor, prior to sending, through the transceiver, scheduling request information to the network device, is further configured to determine the type of the scheduling request information according to the type of numerology supported by the terminal device;

wherein the processor configured to determine the type of the scheduling request information is specifically configured to determine a number of bits of the scheduling request information according to the type of numerology supported by the terminal device.

8. The terminal device according to claim 7, wherein the uplink resource grant information comprises dynamic priority indication information, the dynamic priority indication information is used to indicate priority information of at least one logical channel, the at least one logical channel is used to carry data of different service types, respectively; and
the processor configured to perform data transmission using the target uplink resource according to the uplink resource grant information is specifically configured to transmit, through the transceiver using the target uplink resource, data carried on a logical channel according to the priority information of the at least one logical channel.

9. The terminal device according to claim 8, wherein the priority information of the at least one logical channel is dynamically set.

10. A network device, comprising:
a memory, configured to store a program;
a transceiver, configured to communicate with other devices; and
a processor, configured to execute the program stored in the memory, and when the program is executed, the processor is configured to:
receive, through the transceiver, scheduling request information from a terminal device, the scheduling request information being indicative of a type of numerology supported by the terminal device; and
send, through the transceiver, uplink resource grant information to the terminal device, the uplink resource grant information indicating target uplink resource allocated for the terminal device, being determined according to the scheduling request information, and causing the terminal device to perform data transmission using the target uplink resource according to the uplink resource grant information;
wherein a type of the scheduling request information is used for indicating the type of numerology supported by the terminal device, and
wherein the processor is further configured to determine the type of numerology supported by the terminal device according to the type of the scheduling request information;
wherein, the processor configured to determine the type of numerology supported by the terminal device according to the type of the scheduling request information is specifically configured to determine the type of numerology supported by the terminal device according to a number of bits of the scheduling request information.

11. The network device according to claim 10, wherein a service type of data to be transmitted comprises at least one of enhanced mobile broadband (eMBB) service, ultra-reliable and low latency communications (URLLC) service, or massive machine type of communication (mMTC) service.

12. The network device according to claim 10, wherein the uplink resource grant information comprises dynamic priority indication information, the dynamic priority indication information is used to indicate priority information of at least one logical channel, and the at least one logical channel is used to carry data of different service types, respectively.

13. The network device according to claim 12, wherein the priority information of the at least one logical channel is dynamically set.

\* \* \* \* \*